US010677146B2

(12) United States Patent
Shigemizu et al.

(10) Patent No.: US 10,677,146 B2
(45) Date of Patent: Jun. 9, 2020

(54) SUPERCHARGING SYSTEM, POWER SUPPLY DEVICE FOR SUPERCHARGING SYSTEM, POWER SUPPLY CONTROL METHOD FOR SUPERCHARGING SYSTEM, AND ENGINE SYSTEM

(71) Applicant: MITSUBISHI HEAVY INDUSTRIES ENGINE & TURBOCHARGER, LTD., Sagamihara-shi, Kanagawa (JP)

(72) Inventors: Tetsuro Shigemizu, Tokyo (JP); Yukio Yamashita, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 126 days.

(21) Appl. No.: 16/082,033

(22) PCT Filed: Mar. 9, 2016

(86) PCT No.: PCT/JP2016/057440
§ 371 (c)(1),
(2) Date: Sep. 4, 2018

(87) PCT Pub. No.: WO2017/154149
PCT Pub. Date: Sep. 14, 2017

(65) Prior Publication Data
US 2020/0088092 A1    Mar. 19, 2020

(51) Int. Cl.
*F02B 37/04*    (2006.01)
*F02B 39/10*    (2006.01)
(Continued)

(52) U.S. Cl.
CPC .......... *F02B 37/04* (2013.01); *F02B 37/013* (2013.01); *F02B 39/10* (2013.01); *F02B 39/16* (2013.01); *F02D 41/0007* (2013.01)

(58) Field of Classification Search
CPC ........ F02B 37/04; F02B 37/013; F02B 39/10; F02B 39/16; F02D 41/0007
(Continued)

(56) References Cited

U.S. PATENT DOCUMENTS 5,038,566 A * 8/1991 Hara ....................... F02B 37/10
60/607
6,647,724 B1 11/2003 Arnold et al.
(Continued)

FOREIGN PATENT DOCUMENTS

DE    10 2014 206 294 A1    11/2014
EP    0 397 316 A1    11/1990
(Continued)

OTHER PUBLICATIONS

International Search Report and Written Opinion of the International Searching Authority (Forms PCT/ISA/210 and PCT/ISA/237) for Application No. PCT/JP2016/057440, dated May 24, 2016, with an English translation.

*Primary Examiner* — Audrey K Bradley
*Assistant Examiner* — Dapinder Singh
(74) *Attorney, Agent, or Firm* — Birch, Stewart, Kolasch & Birch, LLP

(57) ABSTRACT

A power supply device includes a first power supply circuit, a second power supply circuit, and a power supply-switching unit. The first power supply circuit includes a power storage device having a first capacity and supplies electricity of a first voltage to the electric motor. The second power supply circuit includes a power storage device having a second capacity smaller than the first capacity and supplies electricity of a second voltage higher than the first voltage to the electric motor. The power supply-switching unit supplies electricity from the second power supply circuit to the electric motor at the tune of starting an operation of the (Continued)

electric motor and thereafter supplies electricity from the first power supply circuit to the electric motor.

9 Claims, 9 Drawing Sheets

(51) Int. Cl.
    *F02D 41/00*     (2006.01)
    *F02B 39/16*     (2006.01)
    *F02B 37/013*     (2006.01)

(58) Field of Classification Search
    USPC .......................................... 60/607, 608, 612
    See application file for complete search history.

(56) References Cited

U.S. PATENT DOCUMENTS

| | | | |
|---|---|---|---|
| 8,555,639 B2* | 10/2013 | Watanabe | B60W 10/06 60/608 |
| 2014/0346865 A1 | 11/2014 | Akashi et al. | |
| 2016/0265422 A1* | 9/2016 | Yamashita | H02P 9/04 |

FOREIGN PATENT DOCUMENTS

| | | |
|---|---|---|
| EP | 3 037 640 A1 | 6/2016 |
| JP | 3136842 B2 | 2/2001 |
| JP | 3971979 B2 | 9/2007 |
| JP | 2010-190145 A | 9/2010 |
| JP | 2015-106330 A | 6/2015 |

* cited by examiner

SUPERCHARGING SYSTEM, POWER SUPPLY DEVICE FOR SUPERCHARGING SYSTEM, POWER SUPPLY CONTROL METHOD FOR SUPERCHARGING SYSTEM, AND ENGINE SYSTEM

TECHNICAL FIELD

The present invention relates to a supercharging system, a power supply device for a supercharging system, a power supply control method for supercharging system, and an engine system.

BACKGROUND ART

The work of a turbocharger depends on energy received by a turbine from exhaust gas. For this reason, in a low rotation region in which the amount of exhaust gas from an engine is small, the effect of a turbocharger is small. Thus, a supercharging system capable of performing supercharging even in a case in which the amount of exhaust gas is small by including a turbocharger and an electric compressor in an air supply passage has been researched. In a case in which a supercharging command is received from an engine when the amount of exhaust gas of the engine is small, a control device of a supercharging system first increases the flow rate of intake air by driving an electric compressor. At this time, in the electric compressor, instant acceleration is required.

In addition, in Patent Document 1, a circuit including means for raising a voltage for increasing the speed of an electric motor and means for performing weak magnetic-flux control is disclosed.

CITATION LIST

Patent Document

[Patent Document 1] Japanese Patent No. 3971979

SUMMARY OF INVENTION

Technical Problem

To instantly accelerate an electric compressor, high torque is required when rotation is started and immediately before speed-up ends. When rotation is started, the torque needs to exceed a static friction force. Immediately before speed-up ends, a sum of torque according to the speed of the electric compressor and torque for acceleration is a maximum. For this reason, in a transient operation period (about 0.5 seconds) from the start of rotation of the electric compressor to the end of speed-up, torque that is higher than that in a normal operation period of the electric compressor needs to be output.

By setting the maximum output power of a battery for driving the electric compressor to be equal to or higher than electric power required in the transient operation period, high torque can be output to the electric compressor in the transient operation period. On the other hand, in a case in which the maximum output power of the battery is configured to be large, the size and the cost of the battery increase.

An object of the present invention is to provide a supercharging system, a power supply device for a supercharging system, a power supply control method for a supercharging system, and an engine system achieving a decrease in a size of an electric compressor while outputting large torque in a transient operation period.

Solution to Problem

According to a first aspect of the present invention, a power supply device for a supercharging system is provided that includes: a first compressor disposed in an intake air flow passage in which intake air supplied to an engine is circulated and configured to compress the intake air by being driven; an electric motor that is configured to drive the first compressor; a second compressor disposed in the intake air flow passage independently from the first compressor and configured to compress the intake air; and a turbine disposed in an exhaust gas flow passage in which exhaust gas from the engine is circulated and configured to drive the second compressor by being rotated by the exhaust gas. The power supply device includes: a first power supply circuit including a power storage device having a first capacity and configured to supply electricity of a first voltage to the electric motor; a second power supply circuit including a power storage device having a second capacity smaller than the first capacity and configured to supply electricity of a second voltage higher than the first voltage to the electric motor; and a power supply-switching unit that is configured to supply electricity from the second power supply circuit to the electric motor when an operation of the electric motor starts and thereafter supplies electricity from the first power supply circuit to the electric motor.

According to a second aspect of the present invention, in the power supply device for the supercharging system according to the first aspect, the power storage device of the first power supply circuit may be a battery, and the power storage device of the second power supply circuit may be a capacitor.

According to a third aspect of the present invention, the power supply device for the supercharging system according to the first or second aspect may further include a power generator that is configured to generate electricity using the engine or kinetic energy of the exhaust gas, and the second power supply circuit may boost the electricity generated by the power generator to the second voltage and output the boosted electricity.

According to a fourth aspect of the present invention, in the power supply device for the supercharging system according to any one of the first to third aspects, the power supply-switching unit may be an analog circuit that is connected to the first power supply circuit and the second power supply circuit and supplies the higher one of a voltage of the first power supply circuit and a voltage of the second power supply circuit to the electric motor.

According to a fifth aspect of the present invention, in the power supply device for the supercharging system according to any one of the first to third aspects, the power supply-switching unit may supply electricity from the second power supply circuit to the electric motor when an operation of the electric motor starts and supply electricity from the first power supply circuit to the electric motor when a first time elapses after the operation of the electric motor starts.

According to a sixth aspect of the present invention, in the power supply device for the supercharging system according to the fifth aspect, the power supply-switching unit may supply electricity from the second power supply circuit to the electric motor when a second time longer than the first time elapses after the operation of the electric motor starts and supply electricity from the first power supply circuit to the electric motor when a third time longer than the second time elapses after the operation of the electric motor starts.

According to a seventh aspect of the present invention, a supercharging system includes: a first compressor disposed in an intake air flow passage in which intake air supplied to an engine is circulated and configured to compress the intake air by being driven; an electric motor that is configured to drive the first compressor; a second compressor disposed in the intake air flow passage independently from the first compressor and configured to compress the intake air; a turbine disposed in an exhaust gas flow passage in which exhaust gas from the engine is circulated and configured to drive the second compressor by being rotated by the exhaust gas; and the power supply device according to any one of the first to sixth aspects.

According to an eighth aspect of the present invention, an engine system includes: an engine; and the supercharging system according to the seventh aspect.

According to a ninth aspect of the present invention, a power supply control method for a supercharging system is provided that includes: a first compressor disposed in an intake air flow passage in which intake air supplied to an engine is circulated and configured to compress the intake air by being driven; an electric motor that is configured to drive the first compressor; a second compressor disposed in the intake air flow passage independently from the first compressor and configured to compress the intake air; a turbine disposed in an exhaust gas flow passage in which exhaust gas from the engine is circulated and configured to drive the second compressor by being rotated by the exhaust gas; a first power supply circuit including a power storage device having a first capacity and configured to supply electricity of a first voltage to the electric motor; and a second power supply circuit including a power storage device having a second capacity smaller than the first capacity and configured to supply electricity of a second voltage higher than the first voltage to the electric motor. The power supply control method includes: supplying electricity from the second power supply circuit to the electric motor when an operation of the electric motor starts; and supplying electricity from the first power supply circuit to the electric motor after the supplying of electricity from the second power supply circuit to the electric motor.

Advantageous Effects of Invention

According to at least one aspect among the aspects described above, the power supply device supplies electricity from the second power supply circuit that has a small capacity and supplies a high voltage to the electric motor during a transient operation period. Accordingly, the first compressor can be driven with high torque during the transient operation period. In addition, after elapse of the transient operation period, the power supply device supplies electricity to the electric motor from the first power supply circuit that has a large capacity and supplies a low voltage. Accordingly, a maximum output voltage of the first power supply circuit can be set to be lower than a voltage to be output in the transient operation period. Accordingly, a designer can achieve a decrease in the size of the first power supply circuit. In addition, the capacity of the second power supply circuit may be a capacity that can be supplied only in the transient operation period. Therefore, a designer can achieve a decrease in the size of the second power supply circuit.

DESCRIPTION OF EMBODIMENTS

First Embodiment

Hereinafter, a first embodiment will be described in detail with reference to the drawings.

Figure 1:
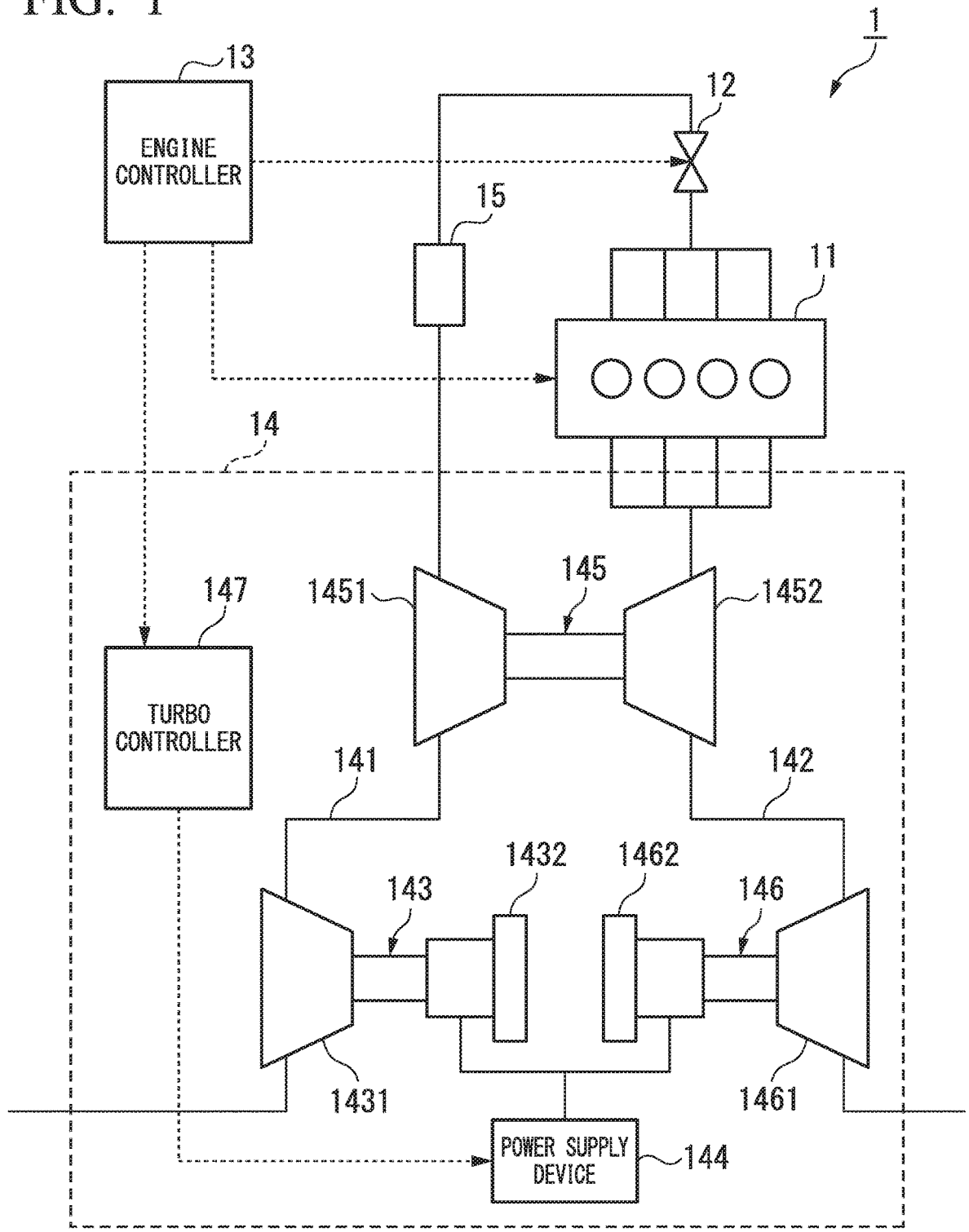
FIG. 1 is a schematic configuration diagram of an engine system according to an embodiment.

FIG. 1 is a schematic configuration diagram of an engine system according to an embodiment.

The engine system 1 includes an engine 11, a throttle valve 12, an engine controller 13, a supercharging system 14, and an intercooler 15.

Examples of the engine 11 include a gasoline engine and a diesel engine.

The throttle valve 12 is a valve that controls the flow rate of intake air supplied to the engine 11.

The engine controller 13 executes adjustment of an injection quantity of the engine 11, adjustment of the degree of opening of the throttle valve 12, and other control on the basis of an engine control signal including the number of rotations and a load. The engine controller 13 outputs a supercharging control signal to the supercharging system 14. The supercharging control signal is a signal including the number of rotations, an injection quantity, an exhaust quantity, and a target supercharging quantity of the engine 11.

The supercharging system 14 is a system for acquiring high combustion energy by increasing the density of intake air of the engine 11.

The intercooler 15 cools intake air compressed by the supercharging system 14.

The supercharging system 14 according to the first embodiment includes an intake air flow passage 141, an exhaust gas flow passage 142, an electric compressor 143, a power supply device 144, a turbocharger 145, a turbine power generator 146, and a turbo controller 147.

The intake air flow passage 141 is a pipe that circulates intake air toward the engine 11.

The exhaust gas flow passage 142 is a pipe that circulates exhaust gas from the engine 11.

The electric compressor 143 is a device that compresses intake air of the engine 11 using electricity supplied from the power supply device 144. The electric compressor 143 includes a compressor 1431 (first compressor) and an electric motor 1432. The compressor 1431 is disposed in the intake air flow passage 141. The compressor 1431 compresses intake air by rotating. The electric motor 1432 is driven by receiving supply of electricity from the power supply device 144. The electric motor 1432 and the compressor 1431 rotate around a common shaft. Accordingly, the electric motor 1432 drives the compressor 1431. The electric motor 1432 is driven using AC power.

The power supply device 144 supplies electricity to the electric compressor 143. In addition, the power supply device 144 charges electricity generated by the turbine power generator 146.

The turbocharger 145 is a device that compresses intake air of the engine 11 using exhaust gas of the engine 11. The turbocharger 145 includes a compressor 1451 (second compressor) and a turbine 1452. The compressor 1451 is disposed in the intake air flow passage 141 of the engine 11. The compressor 1451 compresses the intake air by rotating. The turbine 1452 is disposed in the exhaust gas flow passage 142 of the engine 11. The turbine 1452 rotates around a shaft common to the compressor 1451. Accordingly, the turbine 1452 is rotated by the exhaust gas and thereby drives the compressor 1451.

The turbine power generator 146 is a device that generates power using exhaust gas of the engine 11. The turbine power generator 146 includes a turbine 1461 and a power generator 1462. The turbine 1461 is disposed in the exhaust gas flow passage 142 of the engine 11. The turbine 1461 is rotated by exhaust gas. The power generator 1462 rotates around a shaft common to the turbine 1461. Accordingly, the turbine 1461 is rotated by exhaust gas, and thereby generates electric power in the power generator 1462. The power generator 1462 generates AC power. In other words, the turbine power generator 146 generates electric power using kinetic energy of the exhaust gas.

The turbo controller 147 has a simulation model of the supercharging system 14 and determines whether or not there is a possibility that the electric motor 1432 needs to be driven after a predetermined time (for example, after 10 seconds). The turbo controller 147 is equipped with a learning model trained on a use history of the supercharging system 14 as its input and necessity of driving the electric motor 1432 after a predetermined time as its output and determines whether or not there is a possibility that the electric motor 1432 needs to be driven after a predetermined time. Examples of the learning model include a decision tree, a neural network, and a support vector machine. The turbo controller 147 controls the power supply device 144 on the basis of a supercharging control signal input from the engine controller 13 and a result of determination of the possibility of driving of the electric motor 1432.

Figure 2:
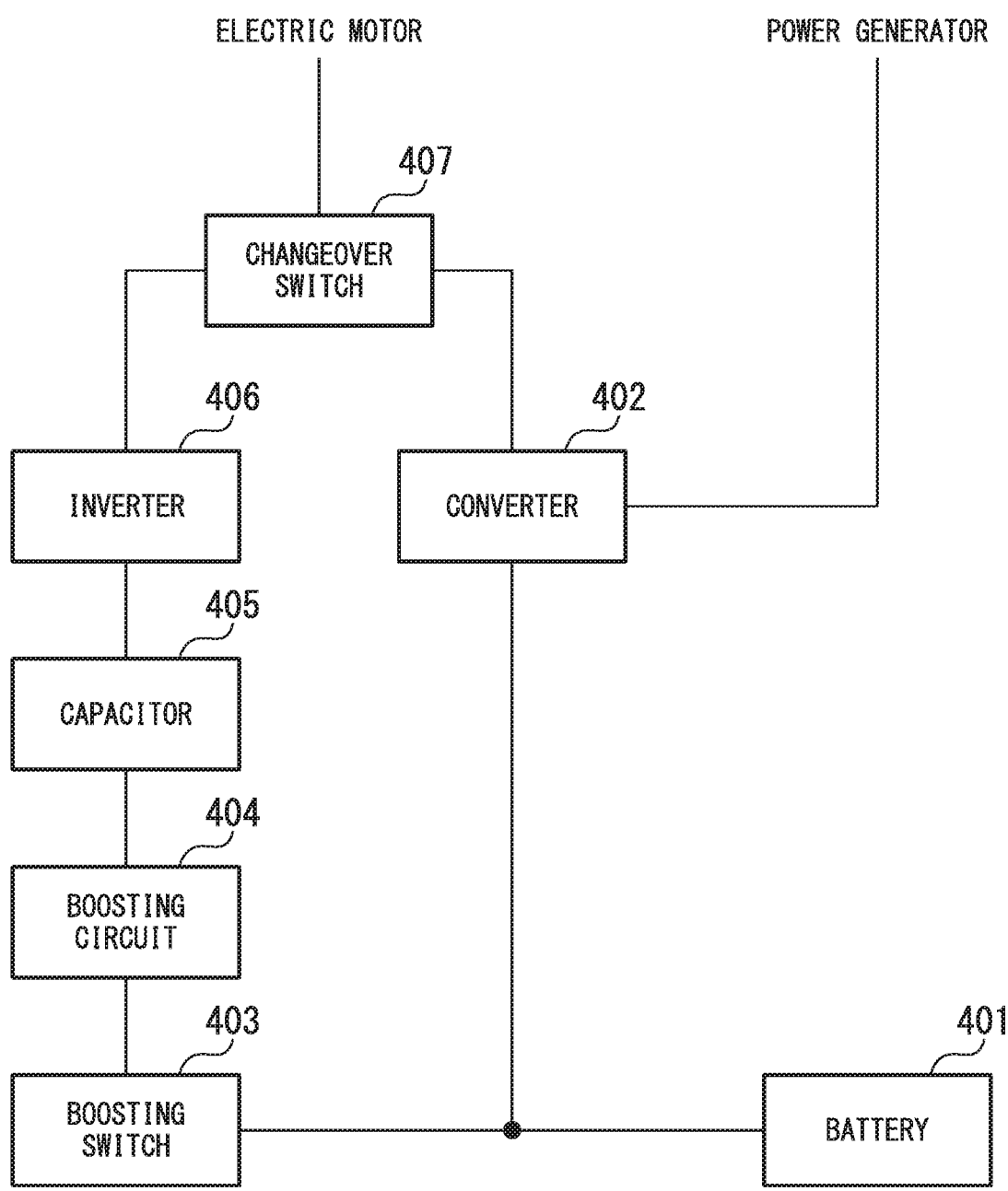
FIG. 2 is a schematic block diagram illustrating the configuration of a power supply device according to a first embodiment.

FIG. 2 is a schematic block diagram illustrating the configuration of a power supply device according to a first embodiment.

The power supply device 144 according to the first embodiment includes a battery 401, a converter 402, a boosting switch 403, a boosting circuit 404, a capacitor 405, an inverter 406, and a changeover switch 407.

The battery 401 is a secondary cell that can charge and discharge electricity. The capacity (first capacity) of the battery 401 is larger than the capacity (second capacity) of the capacitor 405. A maximum output voltage (first voltage) of the battery 401 is lower than a maximum output voltage (second voltage) of the capacitor 405. More specifically, the maximum output voltage of the battery 401 is equal to or higher than a voltage required when the electric motor 1432 is in a steady operation and is less than a voltage required when the electric motor 1432 is in a transient operation. A response speed of the battery 401 is lower than a response speed of the capacitor 405. The battery 401 is connected to the converter 402 and the boosting switch 403. The battery 401 is one example of a first power supply circuit.

The converter 402 includes a DC terminal and an AC terminal. The DC terminal of the converter 402 is connected to the battery 401. The AC terminal of the converter 402 is connected to the changeover switch 407 and the power generator 1462. The converter 402 converts a DC current input to the DC terminal into an AC current and outputs the converted AC current to the AC terminal. The converter 402 converts an AC current input to the AC terminal into a DC current and outputs the converted DC current to the DC terminal.

The boosting switch 403 includes a first terminal and a second terminal. The first terminal of the boosting switch 403 is connected to the battery 401. The second terminal of the boosting switch 403 is connected to the boosting circuit 404. The boosting switch 403 performs switching of connection/disconnection between the first terminal and the second terminal.

The boosting circuit 404 includes an input terminal and an output terminal. The input terminal of the boosting circuit 404 is connected to the boosting switch 403. The output terminal of the boosting circuit 404 is connected to the capacitor 405. The boosting circuit 404 boosts electricity input from the input terminal and outputs the boosted electricity from the output terminal. An example of the boosting circuit 404 is a high-frequency transformer-boosting circuit.

The capacitor 405 includes a first terminal and a second terminal. The first terminal of the capacitor 405 is connected to the boosting circuit 404. The second terminal of the capacitor 405 is connected to the changeover switch 407. The capacitor 405 accumulates the electricity boosted by the boosting circuit 404. The capacity of the capacitor 405 is lower than the capacity of the battery 401. A maximum output voltage of the capacitor 405 is higher than a maximum output voltage of the battery 401. Specifically, the maximum output voltage of the battery 401 is equal to or higher than a voltage required when the electric motor 1432 is in a transient operation. A response speed of the capacitor 405 is higher than a response speed of the battery 401. The capacitor 405 is one example of a second power supply circuit.

The inverter 406 includes a DC terminal and an AC terminal. The DC terminal of the inverter 406 is connected to the capacitor 405. The AC terminal of the inverter 406 is connected to the changeover switch 407. The inverter 406 converts a DC current input to the DC terminal into an AC current and outputs the converted AC current to the AC terminal.

The changeover switch 407 includes a first input terminal, a second input terminal, and an output terminal. The first input terminal of the changeover switch 407 is connected to the converter 402. The second input terminal of the changeover switch 407 is connected to the inverter 406. The output terminal of the changeover switch 407 is connected to the electric motor 1432. The changeover switch 407 performs switching among connection between the output terminal and the first input terminal, connection between the output terminal and the second input terminal, and no connection between the output terminal and any input terminal on the basis of a signal input from the turbo controller 147. The changeover switch 407 is one example of a power supply-switching unit.

Figure 3:
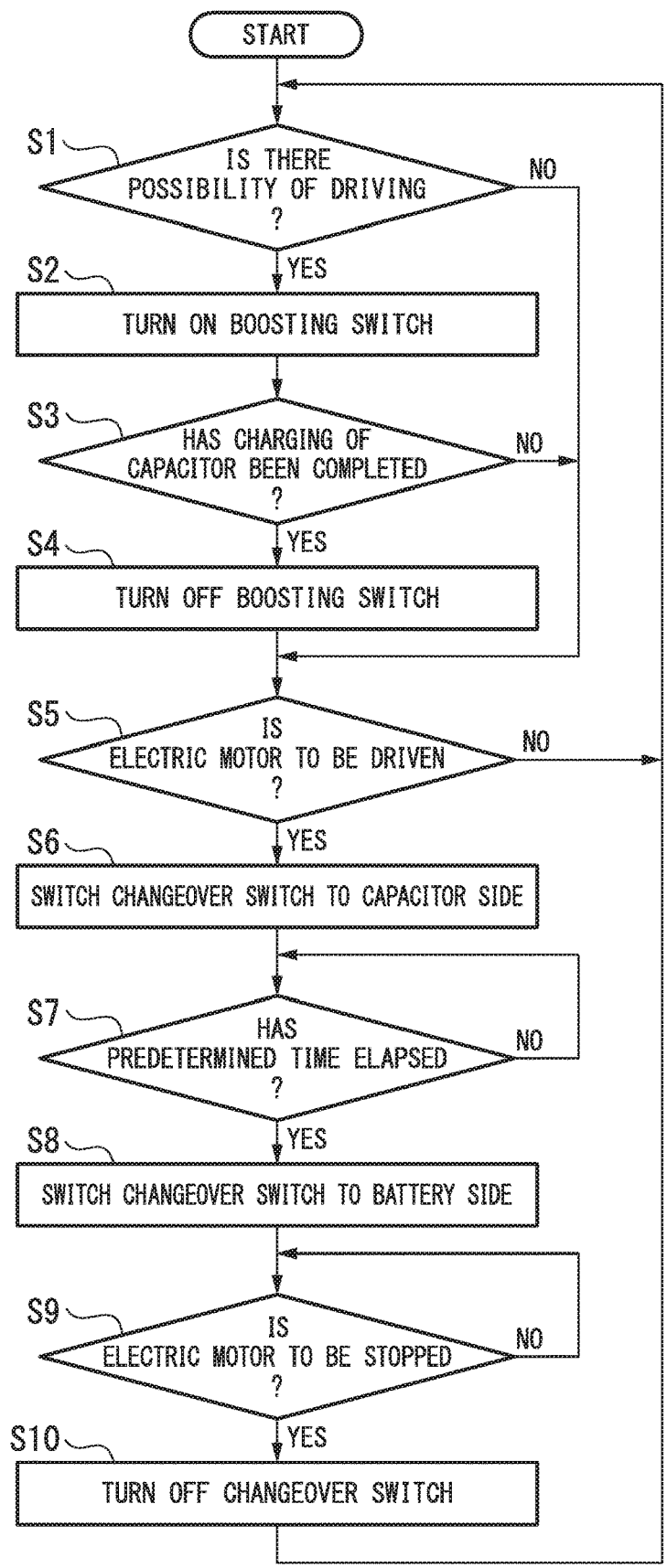
FIG. 3 is a flowchart illustrating a power supply control operation using a turbo controller according to the first embodiment.

FIG. 3 is a flowchart illustrating a power supply control operation using the turbo controller according to the first embodiment.

The turbo controller 147 determines whether or not there is a possibility that the electric motor 1432 may need to be driven after a predetermined time on the basis of the simulation model and the learning model of the supercharging system 14 (Step S1). Specifically, the turbo controller 147 predicts the state of the supercharging system 14 after a predetermined time by inputting a current supercharging control signal to the simulation model. In a case in which a desired supercharging amount is not supplied to the supercharging system 14 after a predetermined time, the turbo controller 147 determines that there is a possibility that the electric motor 1432 may need to be driven. The turbo controller 147 inputs a current supercharging control signal to the learning model and acquires the possibility of driving of the electric motor 1432 after a predetermined time.

In a case in which it is determined that there is a possibility that the electric motor 1432 needs to be driven after a predetermined time (Step S1: Yes), the turbo controller 147 switches the boosting switch 403 of the power supply device 144 to "on" (Step S2). Accordingly, the charging of the capacitor 405 using the boosting circuit 404 is started. Next, the turbo controller 147 determines whether or not the charging of the capacitor 405 has been completed (Step S3). The turbo controller 147, for example, determines whether or not the charging has been completed by determining whether or not a predetermined time has elapsed or determining whether or not a difference between a voltage of the capacitor 405 and an output voltage of the boosting circuit 404 is equal to or less than a predetermined value. In a case in which the charging of the capacitor 405 has been completed (Step S3: Yes), the turbo controller 147 switches the boosting switch 403 to "off" (Step S4). Accordingly, the charging of the capacitor 405 using the boosting circuit 404 is stopped.

In a case in which it is determined that there is no possibility that the electric motor 1432 needs to be driven after a predetermined time (Step S1: No), the turbo controller 147 determines whether or not the electric motor 1432 needs to be driven on the basis of a supercharging control signal input from the engine controller 13 (Step S5). Also in a case in which the charging of the capacitor 405 has not been completed (Step S3: No), similarly, the turbo controller 147 determines whether or not the electric compressor 143 needs to be driven (Step S5). Also in a case in which the boosting switch 403 is switched to off (Step S4), similarly, the turbo controller 147 determines whether or not the electric motor 1432 needs to be driven (Step S5).

In a case in which the electric motor 1432 does not need to be driven (Step S5: No), the turbo controller 147 returns the process to Step S1 and determines the possibility of driving of the electric motor 1432 after a predetermined time. In a case in which the electric motor 1432 needs to be driven (Step S5: Yes), the turbo controller 147 switches the input of the changeover switch 407 of the power supply device 144 to the capacitor 405 side (Step S6). In other words, the turbo controller 147 outputs a signal used for connecting the output terminal and the second input terminal to the changeover switch 407.

Next, the turbo controller 147 determines whether or not an elapsed time from a time at which the input of the changeover switch 407 is switched to the capacitor 405 side in Step S6 has reached a predetermined time (Step S7). The predetermined time is a time corresponding to a transient operation period (about 0.5 seconds) from the start of the rotation of the electric motor 1432 to the end of speed-up. In a case in which the elapsed time from the time at which the changeover switch 407 is switched has not reached the predetermined time (Step S7: No), the turbo controller 147 returns the process to Step S7 and continues the determination of the elapse of the predetermined time.

In a case in which the elapsed time from the time at which the changeover switch 407 is switched has reached the predetermined time (Step S7: Yes), the turbo controller 147 switches the input of the changeover switch 407 of the power supply device 144 to the battery 401 side (Step S8). In other words, the turbo controller 147 outputs a signal used for connecting the output terminal and the first input terminal to the changeover switch 407.

Next, the turbo controller 147 determines whether or not the electric motor 1432 is to be stopped (Step S9). For example, the turbo controller 147 determines that the electric motor 1432 is to be stopped in a case in which the number of rotations of the turbocharger 145 is a predetermined value or more. In a case in which it is determined that the electric motor 1432 is not to be stopped (Step S9: No), the turbo controller 147 returns the process to Step S9 and repeats the determination of whether the electric motor 1432 is to be stopped. In a case in which it is determined that the electric motor 1432 is to be stopped (Step S9: Yes), the turbo controller 147 switches the changeover switch 407 of the power supply device 144 to "off" (Step S10). In other words, the turbo controller 147 outputs a signal used for not connecting the output terminal to any input terminal to the changeover switch 407. Then, the turbo controller 147 returns the process to Step S1 and determines the possibility of driving of the electric motor 1432 after a predetermined time.

In addition, in a case in which electricity charged in the capacitor 405 has reached a capacity of a degree at which a sufficient voltage (second voltage) can be supplied to the electric motor 1432 during a predetermined time, the turbo controller 147 outputs a signal used for presenting information representing that supercharging can be performed to an indicator. The indicator is disposed in a vehicle in which the engine system 1 is mounted. The indicator, for example, is mounted in an LED or the like and turns on to notify a driver of the vehicle that supercharging can be performed. In addition, in another embodiment, the indicator may turn on to notify a driver of the vehicle that supercharging cannot be performed. Furthermore, an indicator according to another embodiment may be mounted in an in-vehicle device or any other device.

In this way, according to the first embodiment, the power supply device 144 includes the changeover switch 407 that switches between output of electricity supplied to the electric motor 1432 from the battery 401 and output of the electricity from the capacitor 405. The changeover switch 407 outputs electricity from the capacitor 405 when the operation of the electric motor 1432 starts using a signal received from the turbo controller 147 and thereafter outputs electricity from the battery 401. Accordingly, the power supply device 144 can exhibit sufficient torque for the electric motor 1432 that is in a transient operation. In addition, the capacitor 405 has a smaller capacity than the battery 401 and supplies a voltage higher than that of the battery 401. For this reason, according to the first embodiment, decreases in size and cost of both the battery 401 and the capacitor 405 can be achieved. According to the first embodiment, the converter 402 can be designed in accordance with an output not at the time of a transient operation but at the time of a steady operation. For this reason, according to the first embodiment, decreases in size and cost of the converter 402 can be achieved. According to the first embodiment, the inverter 406 has no steady output and thus can be designed for an instant output. For this reason, according to the first embodiment, decreases in size and cost of the inverter 406 can be achieved. In addition, the capacitor 405 has a higher response speed than the battery 401 and thus is appropriate for the use of instant acceleration of the electric motor 1432. In addition, the turbo controller 147 outputs a signal used for outputting electricity from the capacitor 405 when the operation of the electric motor 1432 starts and outputting electricity from the battery 401 after elapse of a predetermined time from the start of the operation to the changeover switch 407. By configuring this predetermined time to match a transient operation period of the electric motor 1432, the power supply device 144 can cause the electric motor 1432 to continuously exhibit sufficient torque during a transient operation.

Second Embodiment

Hereinafter, a second embodiment will be described in detail with reference to the drawings.

In an engine system 1 according to the second embodiment, the configuration of a power supply device 144 and the operation of a turbo controller 147 are different from those according to the first embodiment.

Figure 4:
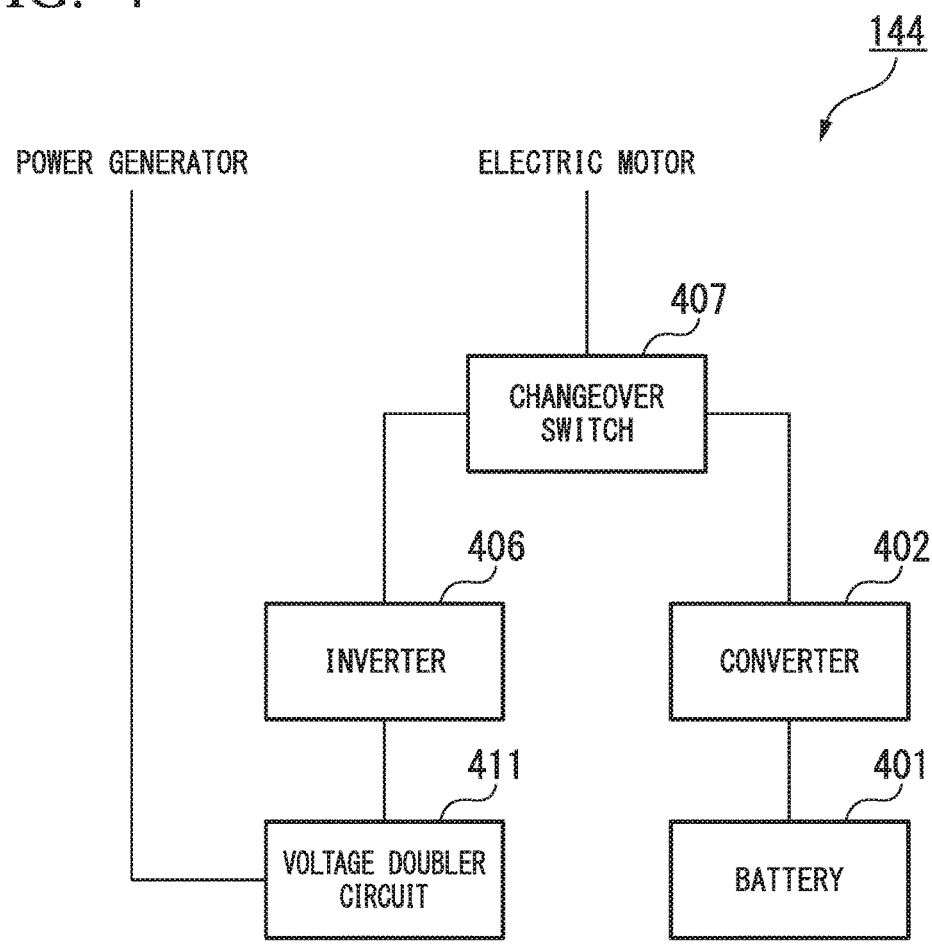
FIG. 4 is a schematic block diagram illustrating the configuration of a power supply device according to a second embodiment.

FIG. 4 is a schematic block diagram illustrating the configuration of the power supply device according to the second embodiment.

The power supply device 144 according to the second embodiment includes a battery 401, a converter 402, an inverter 406, a changeover switch 407, and a voltage doubler circuit 411.

The battery 401 is a secondary cell that can charge and discharge electricity. The battery 401 is connected to the converter 402.

The converter 402 includes a DC terminal and an AC terminal. The DC terminal of the converter 402 is connected to the battery 401. The AC terminal of the converter 402 is connected to the changeover switch 407. The converter 402 converts a DC current input to the DC terminal into an AC current and outputs the converted AC current to the AC terminal.

The inverter 406 includes a DC terminal and an AC terminal. The DC terminal of the inverter 406 is connected to the voltage doubler circuit 411. The AC terminal of the inverter 406 is connected to the changeover switch 407. The inverter 406 converts a DC current input to the DC terminal into an AC current and outputs the converted AC current to the AC terminal.

The changeover switch 407 includes a first input terminal, a second input terminal, and an output terminal. The first input terminal of the changeover switch 407 is connected to the converter 402. The second input terminal of the changeover switch 407 is connected to the inverter 406. The output terminal of the changeover switch 407 is connected to the electric motor 1432. The changeover switch 407 performs switching among connection between the output terminal and the first input terminal, connection between the output terminal and the second input terminal, and no connection between the output terminal and any input terminal on the basis of a signal input from the turbo controller 147. The changeover switch 407 is one example of a power supply-switching unit.

The voltage doubler circuit 411 includes an input terminal and an output terminal. The input terminal of the voltage doubler circuit 411 is connected to a power generator 1462. The output terminal of the voltage doubler circuit 411 is connected to the inverter 406. The voltage doubler circuit 411 converts AC electricity input to the input terminal into DC electricity having a voltage that is twice that of the AC electricity and outputs the converted DC electricity to the output terminal.

Figure 5:
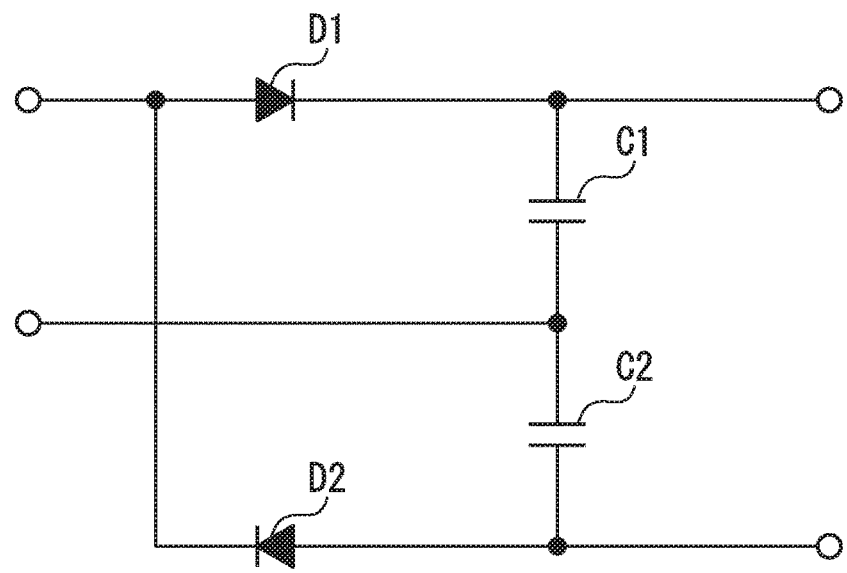
FIG. 5 is a circuit diagram illustrating one example of a voltage doubler circuit according to the second embodiment.

FIG. 5 is a circuit diagram illustrating one example of the voltage doubler circuit according to the second embodiment.

As illustrated in FIG. 5, the voltage doubler circuit 411 may be a full-wave voltage doubler circuit including a diode D1, a diode D2, a capacitor C1, and a capacitor C2. The voltage doubler circuit 411 rectifies an AC voltage applied to a pair of input terminals using the diode D1 connected in a forward direction, smoothes a resultant voltage using the capacitor C1, rectifies a smoothed voltage using the diode D2 connected in a reverse direction, and smoothes a resultant voltage using the capacitor C2. Accordingly, the voltage doubler circuit 411 outputs a DC voltage having a sum of both terminal voltages of the capacitor C1 and the capacitor C2 connected in series, in other words, having a voltage that is twice the input voltage. The capacity of the capacitor C1 and the capacitor C2 is smaller than the capacity of the battery 401. The configuration of the voltage doubler circuit 411 is not limited to this. Other examples of the voltage doubler circuit 411 include a half-wave voltage doubler circuit, a Cockcroft-Walton circuit, and a charge pump. The voltage doubler circuit 411 is one example of a second power supply circuit.

Figure 6:
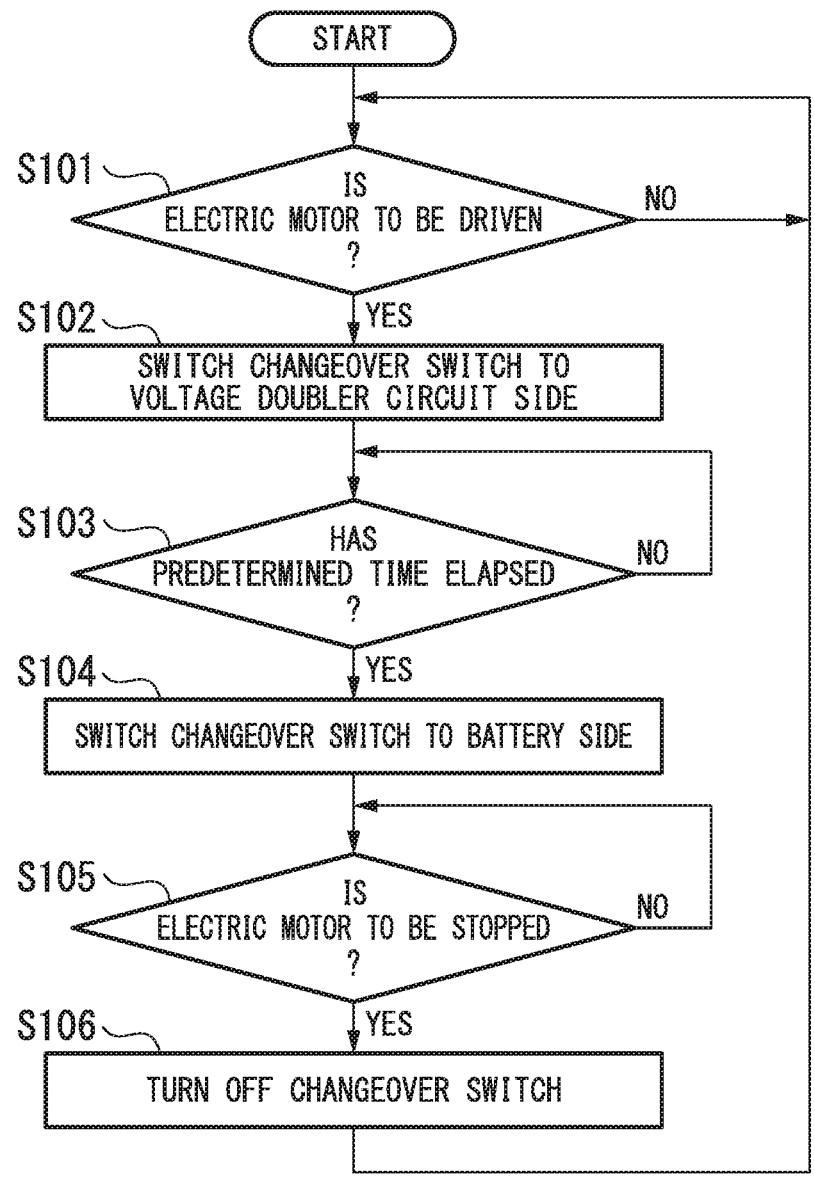
FIG. 6 is a flowchart illustrating a power supply control operation using a turbo controller according to the second embodiment.

FIG. 6 is a flowchart illustrating a power supply control operation using the turbo controller according to the second embodiment.

The turbo controller 147 determines whether or not the electric motor 1432 needs to be driven on the basis of a supercharging control signal input from the engine controller 13 (Step S101). In a case in which the electric motor 1432 does not need to be driven (Step S101: No), the turbo controller 147 returns the process to Step S101 and determines a possibility of driving of the electric motor 1432 after a predetermined time. In a case in which the electric motor 1432 needs to be driven (Step S101: Yes), the turbo controller 147 switches the input of the changeover switch 407 of the power supply device 144 to the voltage doubler circuit 411 side (Step S102). In other words, the turbo controller 147 outputs a signal used for connecting the output terminal and the second input terminal to the changeover switch 407.

Next, the turbo controller 147 determines whether or not an elapsed time from a time at which the input of the changeover switch 407 is switched to the voltage doubler circuit 411 side in Step S102 has reached a predetermined time (Step S103). The predetermined time is a time corresponding to a transient operation period (about 0.5 seconds) from the start to the end of speed-up of the rotation of the electric motor 1432. In a case in which the elapsed time from the time at which the changeover switch 407 is switched has not reached the predetermined time (Step S103: No), the turbo controller 147 returns the process to Step S103 and continues the determination of the elapse of the predetermined time.

In a case in which the elapsed time from the time at which the changeover switch 407 is switched has reached the predetermined time (Step S103: Yes), the turbo controller 147 switches the input of the changeover switch 407 of the power supply device 144 to the battery 401 side (Step S104). In other words, the turbo controller 147 outputs a signal used for connecting the output terminal and the first input terminal to the changeover switch 407.

Next, the turbo controller 147 determines whether or not the electric motor 1432 is to be stopped (Step S105). For example, the turbo controller 147 determines that the electric motor 1432 is to be stopped in a case in which the number of rotations of the turbocharger 145 is a predetermined value or more. In a case in which it is determined that the electric motor 1432 is not to be stopped (Step S105: No), the turbo controller 147 returns the process to Step S105 and repeats the determination of whether the electric motor 1432 is to be stopped. In a case in which it is determined that the electric motor 1432 is to be stopped (Step S105: Yes), the turbo controller 147 switches the changeover switch 407 of the power supply device 144 to "off" (Step S106). In other words, the turbo controller 147 outputs a signal used for not connecting the output terminal to any input terminal to the changeover switch 407. Then, the turbo controller 147 returns the process to Step S1 and determines the possibility of driving of the electric motor 1432 after a predetermined time.

In this way, according to the second embodiment, the power supply device 144 includes the changeover switch 407 that switches between output of electricity supplied to the electric motor 1432 from the battery 401 and output of the electricity from the voltage doubler circuit 411. Accordingly, similar to the first embodiment, the power supply device 144 can exhibit sufficient torque to the electric motor 1432 that is in a transient operation.

According to the second embodiment, the voltage doubler circuit 411 amplifies a voltage generated by the power generator 1462. Accordingly, the power supply device 144 can drive the electric motor 1432 using electricity output by the voltage doubler circuit 411 without determining whether to charge the capacitor or not on the basis of a prediction or the like.

In addition, although the voltage doubler circuit 411 according to the second embodiment amplifies a voltage output by the power generator 1462, the voltage doubler circuit 411 is not limited thereto. For example, a voltage doubler circuit 411 according to another embodiment may amplify a voltage output from an alternator generating electric power using kinetic energy of the engine 11 or the converter 402.

Third Embodiment

Hereinafter, a third embodiment will be described in detail with reference to the drawings.

In an engine system 1 according to the third embodiment, the configuration of a power supply device 144 is different from that according to the first embodiment. The power supply device 144 according to the third embodiment switches a supply source of electricity for an electric motor 1432 without receiving a signal from a turbo controller 147.

Figure 7:
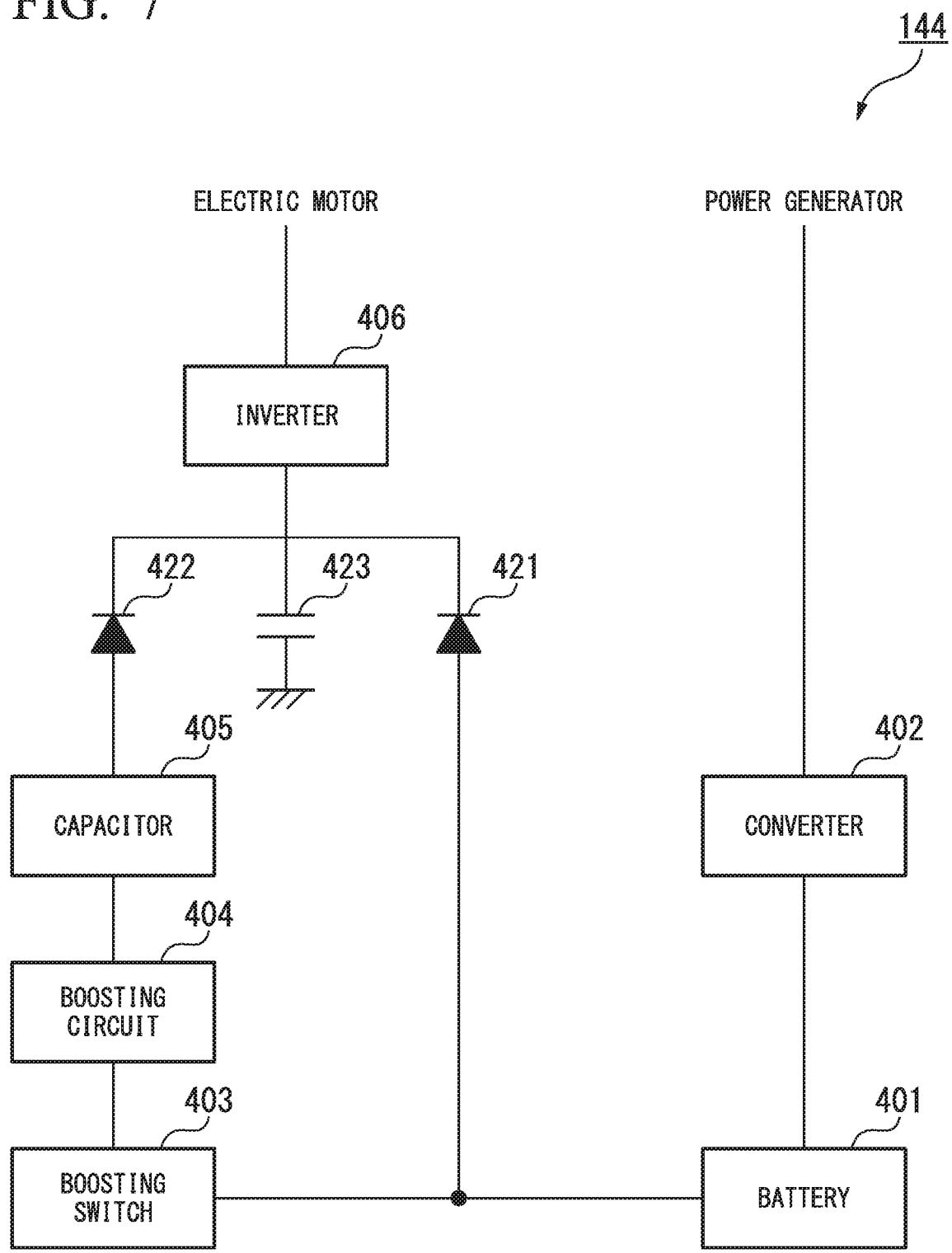
FIG. 7 is a schematic block diagram illustrating the configuration of a power supply device according to a third embodiment.

FIG. 7 is a schematic block diagram illustrating the configuration of the power supply device according to the third embodiment.

The power supply device 144 according to the third embodiment includes a battery 401, a converter 402, a boosting switch 403, a boosting circuit 404, a capacitor 405, an inverter 406, a first diode 421, a second diode 422, and a bypass capacitor 423.

The battery 401 is a secondary cell that can charge and discharge electricity. The capacity of the battery 401 is larger than the capacity of the capacitor 405. A maximum output voltage of the battery 401 is lower than a maximum output voltage of the capacitor 405. Specifically, the maximum output voltage of the battery 401 is equal to or higher than a voltage required when the electric motor 1432 is in a steady operation and is less than a voltage required when the electric motor 1432 is in a transient operation. A response speed of the battery 401 is lower than a response speed of the capacitor 405. The battery 401 is connected to the converter 402 and the anode of the first diode 421. The battery 401 is one example of a first power supply circuit.

The converter 402 includes a DC terminal and an AC terminal. The DC terminal of the converter 402 is connected to the battery 401. The AC terminal of the converter 402 is connected to the power generator 1462. The converter 402 converts an AC current input to the AC terminal into a DC current and outputs the converted DC current to the DC terminal.

The boosting switch 403 includes a first terminal and a second terminal. The first terminal of the boosting switch 403 is connected to the battery 401. The second terminal of the boosting switch 403 is connected to the boosting circuit 404. The boosting switch 403 performs switching of connection/disconnection between the first terminal and the second terminal.

The boosting circuit 404 includes an input terminal and an output terminal. The input terminal of the boosting circuit 404 is connected to the boosting switch 403. The output terminal of the boosting circuit 404 is connected to the capacitor 405. The boosting circuit 404 boosts electricity input from the input terminal and outputs the boosted electricity from the output terminal. An example of the boosting circuit 404 is a high-frequency transformer-boosting circuit.

The capacitor 405 includes a first terminal and a second terminal. The first terminal of the capacitor 405 is connected to the boosting circuit 404. The second terminal of the capacitor 405 is connected to the anode of the second diode 422. The capacitor 405 accumulates the electricity boosted by the boosting circuit 404. The capacity of the capacitor 405 is lower than the capacity of the battery 401. A maximum output voltage of the capacitor 405 is higher than a maximum output voltage of the battery 401. Specifically, the maximum output voltage of the battery 401 is equal to or higher than a voltage required when the electric motor 1432 is in a transient operation. A response speed of the capacitor 405 is higher than a response speed of the battery 401. The capacitor 405 is one example of a second power supply circuit.

The inverter 406 includes a DC terminal and an AC terminal. The DC terminal of the inverter 406 is connected to the cathode of the first diode 421, the cathode of the second diode 422, and the bypass capacitor 423. The AC terminal of the inverter 406 is connected to the electric motor 1432. The inverter 406 converts a DC current input to the DC terminal into an AC current and outputs the converted AC current to the AC terminal.

By connecting the cathode of the first diode 421 and the cathode of the second diode 422 to the DC terminal of the inverter 406, electricity is supplied to the inverter 406 from one of the battery 401 and the capacitor 405 having a higher voltage. By connecting the bypass capacitor 423 to the DC terminal of the inverter 406, an AC component according to noise in electricity input to the inverter 406 can be removed.

In this way, according to the third embodiment, the power supply-switching unit that switches a supply source of electricity supplied to the electric motor 1432 is configured of an analog circuit including the first diode 421, the second diode 422, and the bypass capacitor 423. Accordingly, the power supply device 144 can switch the supply source of electricity without using a signal output by the turbo controller 147.

Fourth Embodiment

Hereinafter, a fourth embodiment will be described in detail with reference to the drawings.

In an engine system 1 according to the fourth embodiment, the configuration of a power supply device 144 is different from that according to the first embodiment. The power supply device 144 according to the fourth embodiment, similar to the third embodiment, switches a supply source of electricity for the electric motor 1432 without receiving a signal from the turbo controller 147.

Figure 8:
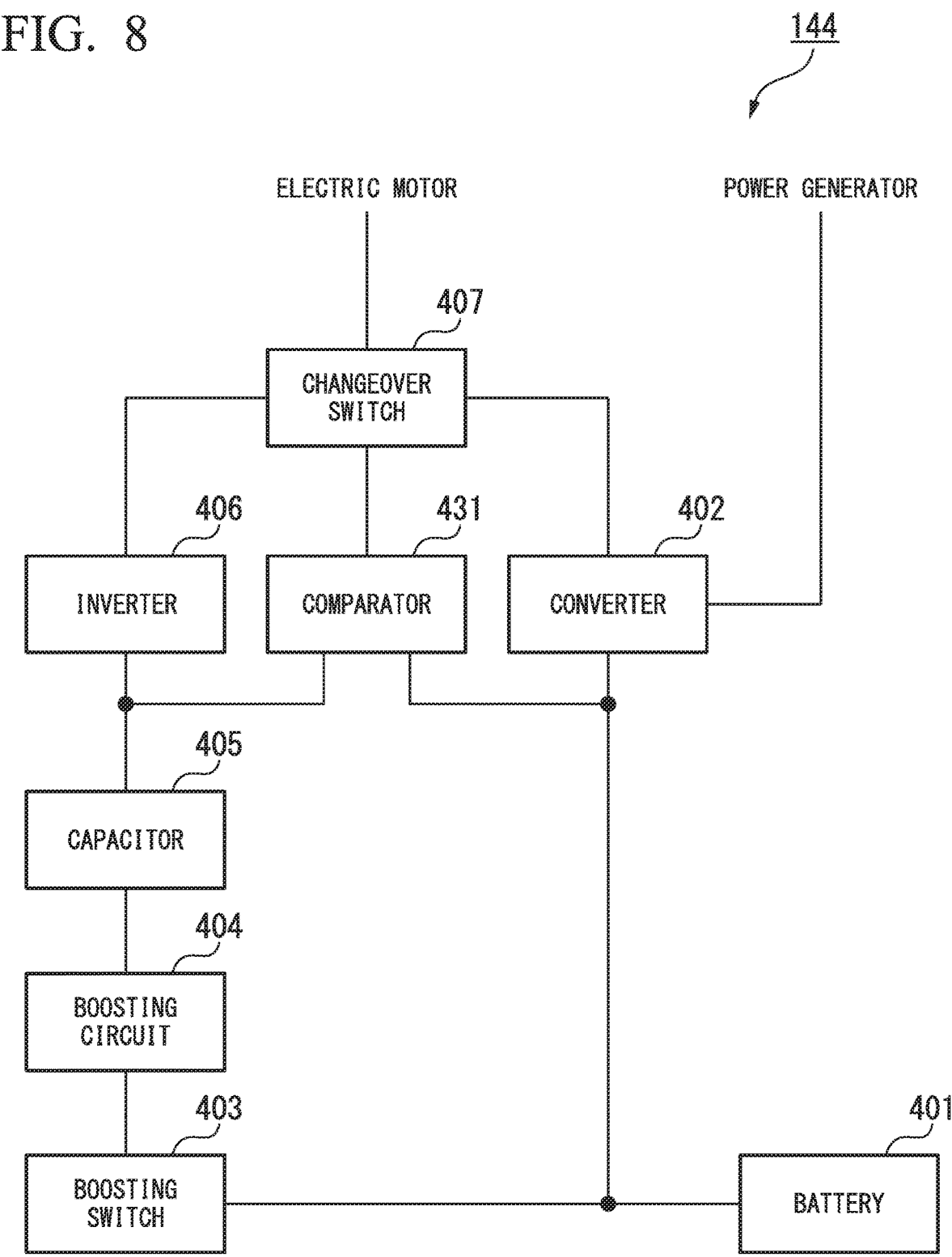
FIG. 8 is a schematic block diagram illustrating the configuration of a power supply device according to a fourth embodiment.

FIG. 8 is a schematic block diagram illustrating the configuration of the power supply device according to the fourth embodiment.

The power supply device 144 according to the fourth embodiment further includes a comparator 431 in addition to the configuration according to the first embodiment. A changeover switch 407 according to the fourth embodiment has a configuration different from that according to the first embodiment.

The comparator 431 includes a first input terminal, a second input terminal, and an output terminal. The first input terminal of the comparator 431 is connected to a battery 401 in parallel with a converter 402. The second input terminal of the comparator 431 is connected to a capacitor 405 in parallel with an inverter 406. The output terminal of the comparator 431 is connected to the changeover switch 407. The comparator 431 compares a voltage applied to the first input terminal with a voltage applied to the second input terminal, and a voltage according to a result of the comparison is output from the output terminal. For example, in a case in which the voltage applied to the first input terminal is higher than the voltage applied to the second input terminal, the comparator 431 outputs a positive voltage from the output terminal. In a case in which the voltage applied to the first input terminal is lower than the voltage applied to the second input terminal, the comparator 431 outputs a negative voltage from the output terminal.

The changeover switch 407 includes a control terminal in addition to a first input terminal, a second input terminal, and an output terminal. The control terminal of the changeover switch 407 is connected to the comparator 431. The changeover switch 407 performs switching between connection of the output terminal and the first input terminal and connection of the output terminal and the second input terminal in accordance with a voltage applied to the control terminal.

For example, the changeover switch 407 connects the output terminal and the first input terminal in a case in which the voltage applied to the control terminal is a positive voltage. The changeover switch 407 connects the output terminal and the second input terminal in a case in which the voltage applied to the control terminal is a negative voltage. The changeover switch 407, for example, is configured of a field-effect transistor (FET), an insulated-gate bipolar transistor (IGBT), or any other semiconductor switching device. A circuit including the changeover switch 407 and the comparator 431 is one example of a power supply-switching unit.

In this way, according to the fourth embodiment, the power supply-switching unit that switches a supply source of electricity supplied to the electric motor 1432 is configured of an analog circuit including the changeover switch 407 and the comparator 431. Accordingly, the power supply device 144 can switch the supply source of electricity without using a signal output by the turbo controller 147.

Fifth Embodiment

Hereinafter, a fifth embodiment will be described in detail with reference to the drawings.

In an engine system 1 according to the fifth embodiment, the operation of a turbo controller 147 is different from that according to the first embodiment. The engine system 1 according to the fifth embodiment supplies a high voltage to the electric motor 1432 in a period at the time of starting rotation and a period immediately before the end of speed-up in the transient operation period of the electric motor 1432.

Figure 9:
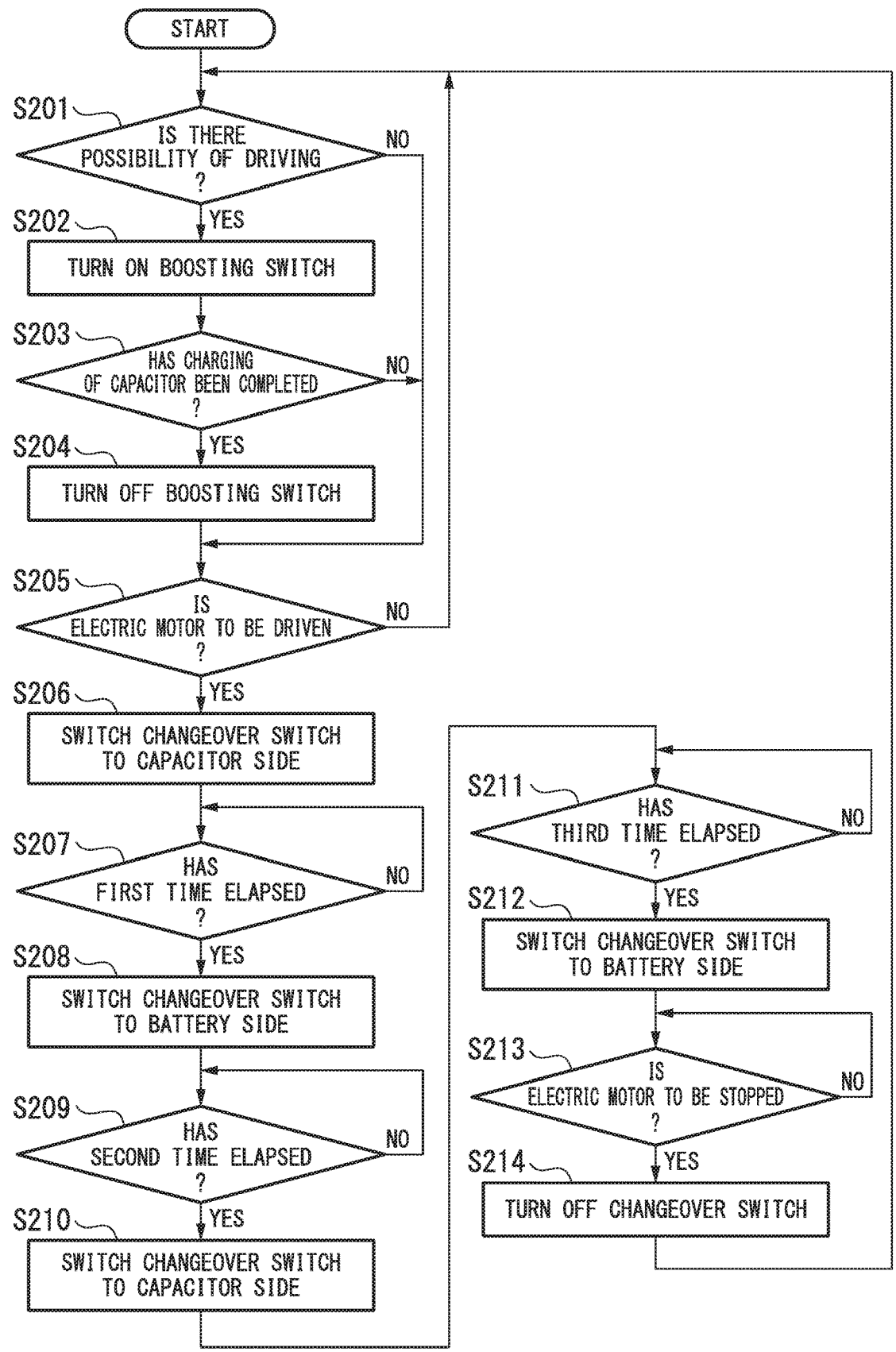
FIG. 9 is a flowchart illustrating a power supply control operation using a turbo controller according to a fifth embodiment.

FIG. 9 is a flowchart illustrating a power supply control operation using the turbo controller according to the fifth embodiment.

The turbo controller 147 determines whether or not there is a possibility that the electric motor 1432 needs to be driven after a predetermined time on the basis of the simulation model and the learning model of a supercharging system 14 (Step S201). In a case in which it is determined that there is a possibility that an electric motor 1432 needs to be driven after a predetermined time (Step S201: Yes), the turbo controller 147 switches a boosting switch 403 of the power supply device 144 to "on" (Step S202). Accordingly, the charging of the capacitor 405 using the boosting circuit 404 is started. Next, the turbo controller 147 determines whether or not the charging of the capacitor 405 has been completed (Step S203). In a case in which the charging of the capacitor 405 has been completed (Step S203: Yes), the turbo controller 147 switches the boosting switch 403 to off (Step S204). Accordingly, the charging of the capacitor 405 using the boosting circuit 404 is stopped.

In a case in which it is determined that there is no possibility that the electric motor 1432 needs to be driven after a predetermined time (Step S201: No), the turbo controller 147 determines whether or not the electric motor 1432 needs to be driven on the basis of a supercharging control signal input from the engine controller 13 (Step S205). Also in a case in which the charging of the capacitor 405 has not been completed (Step S203: No), similarly, the turbo controller 147 determines whether or not the electric compressor 143 needs to be driven (Step S205). Also in a case in which the boosting switch 403 is switched off (Step S204), similarly, the turbo controller 147 determines whether or not the electric motor 1432 needs to be driven (Step S205).

In a case in which the electric motor 1432 does not need to be driven (Step S205: No), the turbo controller 147 returns the process to Step S201 and determines the possibility of driving of the electric motor 1432 after a predetermined time. In a case in which the electric motor 1432 needs to be driven (Step S205: Yes), the turbo controller 147 switches the input of the changeover switch 407 of the power supply device 144 to the capacitor 405 side (Step S206). In other words, the turbo controller 147 outputs a signal used for connecting the output terminal and the second input terminal to the changeover switch 407.

Next, the turbo controller 147 determines whether or not an elapsed time from a time at which the input of the changeover switch 407 is switched to the capacitor 405 side in Step S206 has reached a first time (Step S207). The first time is a time corresponding to a period in which a static friction force is applied to the electric motor 1432. In a case in which the elapsed time from the time at which the changeover switch 407 is switched has not reached the first time (Step S207: No), the turbo controller 147 returns the process to Step S207 and continues the determination of the elapse of the predetermined time.

In a case in which the elapsed time from the time at which the changeover switch 407 is switched has reached the first time (Step S207: Yes), the turbo controller 147 switches the input of the changeover switch 407 of the power supply device 144 to the battery 401 side (Step S208). In other words, the turbo controller 147 outputs a signal used for connecting the output terminal and the first input terminal to the changeover switch 407.

Next, the turbo controller 147 determines whether or not the elapsed time from a time at which the input of the changeover switch 407 is switched to the capacitor 405 side in Step S206 has reached a second time (Step S209). The second time is a time corresponding to a period until a load required for the electric motor 1432 reaches a predetermined load higher than a load at the time of a steady operation from the start of the rotation of the electric motor 1432. The second time is longer than the first time. In a case in which the elapsed time from the time at which the changeover switch 407 is switched has not reached the second time (Step S209: No), the turbo controller 147 returns the process to Step S209 and continues the determination of the elapse of the predetermined time.

In a case in which the elapsed time from the time at which the changeover switch 407 is switched has reached the second time (Step S209: Yes), the turbo controller 147 switches the input of the changeover switch 407 of the power supply device 144 to the capacitor 405 side (Step S210). In other words, the turbo controller 147 outputs a signal used for connecting the output terminal and the second input terminal to the changeover switch 407.

Next, the turbo controller 147 determines whether or not the elapsed time from the time at which the input of the changeover switch 407 is switched to the capacitor 405 side in Step S206 has reached a third time (Step S211). The third time is a time corresponding to a transient operation period of the electric motor 1432. The third time is longer than the second time. In a case in which the elapsed time from the time at which the changeover switch 407 is switched has not reached the third time (Step S211: No), the turbo controller 147 returns the process to Step S211 and continues the determination of the elapse of the predetermined time.

In a case in which the elapsed time from the time at which the changeover switch 407 is switched has reached the third time (Step S211: Yes), the turbo controller 147 switches the input of the changeover switch 407 of the power supply device 144 to the battery 401 side (Step S212). In other words, the turbo controller 147 outputs a signal used for connecting the output terminal and the first input terminal to the changeover switch 407.

Next, the turbo controller 147 determines whether or not the electric motor 1432 is to be stopped (Step S213). For example, the turbo controller 147 determines that the electric motor 1432 is to be stopped in a case in which the number of rotations of the turbocharger 145 is a predetermined value or more. In a case in which it is determined that the electric motor 1432 is not to be stopped (Step S213: No), the turbo controller 147 returns the process to Step S213 and repeats the determination of whether the electric motor 1432 is to be stopped. In a case in which it is determined that the electric motor 1432 is to be stopped (Step S213: Yes), the turbo controller 147 switches the changeover switch 407 of the power supply device 144 to "off" (Step S214). In other words, the turbo controller 147 outputs a signal used for not connecting the output terminal to any input terminal to the changeover switch 407. Then, the turbo controller 147 returns the process to Step S201 and determines the possibility of driving of the electric motor 1432 after a predetermined time.

In this way, according to the fifth embodiment, the turbo controller 147 outputs a signal used for outputting electricity from the capacitor 405 to the changeover switch 407 until the elapse of the first time from the start of the operation of the electric motor 1432 and until the elapse of the third time from the elapse of the second time. On the other hand, the turbo controller 147 outputs a signal used for outputting electricity from the battery 401 to the changeover switch 407 until the elapse of the second time from the elapse of the first time and after the elapse of the third time. Accordingly, the power supply device 144 can cause the electric motor 1432 to exhibit sufficient torque during a period in which high torque is necessary in the transient operation period. In other words, according to the fifth embodiment, the electric motor 1432 is caused to exhibit sufficient torque using the capacitor 405 having a capacity smaller than that according to the first embodiment.

The configuration of the power supply device 144 according to the fifth embodiment is not limited to the configuration described above. For example, the configuration of a power supply device 144 according to another embodiment, similar to the second embodiment, may be that illustrated in FIG. 4.

Other Embodiment

While several embodiments have been described in detail above with reference to the drawings, a specific configuration is not limited to those described above, and various design changes and the like may be made.

For example, although the first power supply circuit of the power supply device 144 according to the embodiment described above includes the battery 401, the first power supply circuit is not limited thereto. For example, a first power supply circuit according to another embodiment may include another power storage device such as a capacitor instead of the battery 401. Although the second power supply circuit of the power supply device 144 according to the embodiment described above includes the capacitor 405 or the capacitor C2 and the capacitor C2, the second power supply circuit is not limited thereto. For example, the second power supply circuit according to another embodiment may include another power storage device such as a battery instead of the capacitor 405.

Although the turbo controller 147 according to the embodiment described above outputs a signal used for determining a supply source of electricity supplied to the electric motor 1432 to the power supply device 144, the configuration is not limited thereto. For example, in another embodiment, the engine controller 13 may output a signal used for determining a supply source of electricity supplied to the electric motor 1432 to the power supply device 144. In another embodiment, the supercharging system 14 may include a power control device separate from the turbo controller 147, and the power control device may output a signal used for determining a supply source of electricity supplied to the electric motor 1432 to the power supply device 144.

Figure 10:
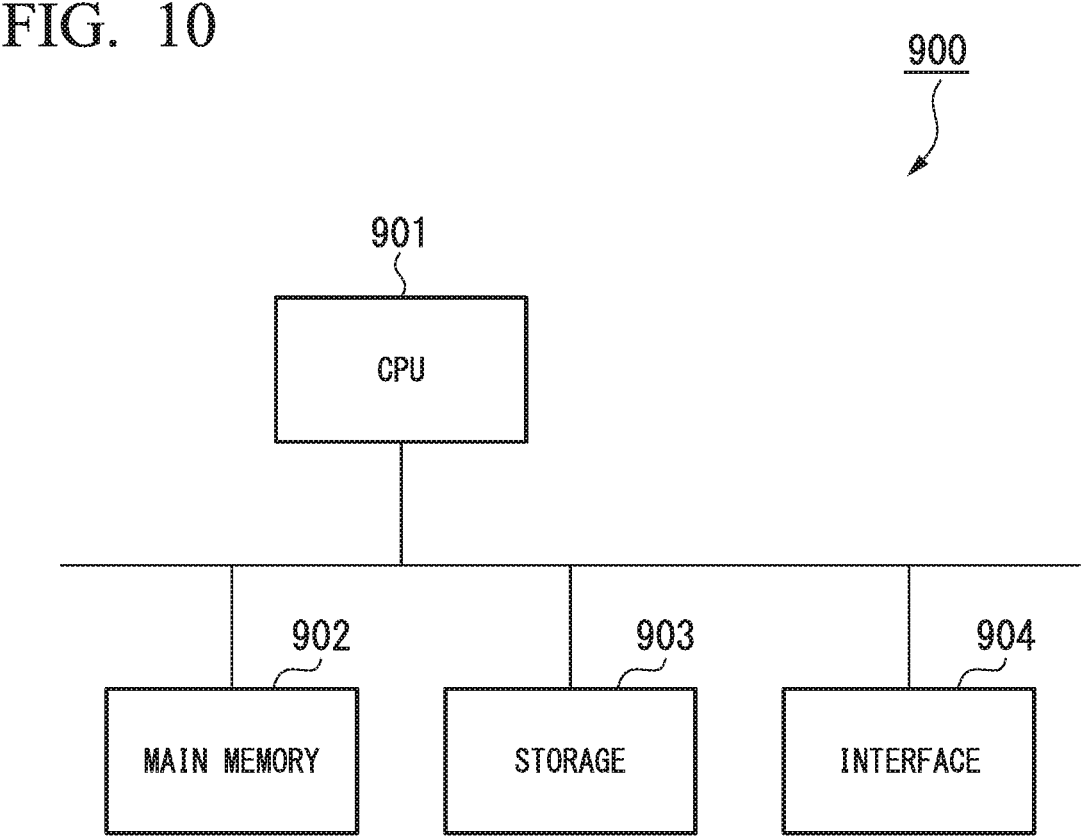
FIG. 10 is a schematic block diagram illustrating the configuration of a computer according to at least one embodiment.

FIG. 10 is a schematic block diagram illustrating the configuration of a computer according to at least one embodiment.

The computer 900 includes a CPU 901, a main memory 902, a storage 903, and an interface 904.

The turbo controller 147 described above is mounted in the computer 900. The operation described above is stored in the storage 903 in the form of a program. The CPU 901 reads the program from the storage 903, expands the program in the main memory 902, and executes the process described above in accordance with the program.

At least in one embodiment, the storage 903 is one example of a non-temporary tangible medium. Other examples of the non-temporary tangible medium include a magnetic disk, a magneto-optical disk, a compact disc read-only memory (CD-ROM), a digital versatile disc read-only memory (DVD-ROM), a semiconductor memory, and the like connected through the interface 904. In addition, in a case in which this program is delivered to the computer 900 through a communication line, the computer 900 that has received the delivery may expand the program in the main memory 902 and execute the process described above.

Furthermore, the program may be used for realizing a part of the functions described above. In addition, the program may be a program that is realized in combination with another program stored in the storage 903 in advance, a so-called differential file (differential program).

INDUSTRIAL APPLICABILITY

According to at least one of the embodiments described above, the power supply device supplies electricity from the second power supply circuit having a small capacity and supplying a high voltage to the electric motor during a transient operation period. Accordingly, the first compressor can be driven with high torque during the transient operation period. In addition, after elapse of the transient operation period, the power supply device supplies electricity to the electric motor from the first power supply circuit having a large capacity and supplying a low voltage. Accordingly, a maximum output voltage of the first power supply circuit can be configured to be lower than a voltage to be output in the transient operation period. Accordingly, a designer can achieve a decrease in the size of the first power supply circuit. In addition, the capacity of the second power supply circuit may be a capacity that can be supplied only in the transient operation period. Therefore, the designer can achieve a decrease in the size of the second power supply circuit.

REFERENCE SIGNS LIST

1 Engine system
11 Engine
13 Engine controller
14 Supercharging system
143 Electric compressor
1431 Compressor
1432 Electric motor
144 Power supply device
145 Turbocharger
1451 Compressor
1452 Turbine
146 Turbine power generator
1461 Turbine
1462 Power generator
147 Turbo controller
401 Battery
402 Converter
403 Boosting switch
404 Boosting circuit
405 Capacitor
406 Inverter
407 Changeover switch
411 Voltage doubler circuit
421 First diode
422 Second diode
423 Bypass capacitor
431 Comparator

The invention claimed is:

1. A power supply device for a supercharging system that includes:
   a first compressor disposed in an intake air flow passage in which intake air supplied to an engine is circulated and configured to compress the intake air by being driven;
   an electric motor that is configured to drive the first compressor;
   a second compressor disposed in the intake air flow passage independently from the first compressor and configured to compress the intake air; and
   a turbine disposed in an exhaust gas flow passage in which exhaust gas from the engine is circulated and configured to drive the second compressor by being rotated in accordance with the exhaust gas,
   the power supply device comprising:
   a first power supply circuit including a power storage device having a first capacity and configured to supply electricity of a first voltage to the electric motor;
   a second power supply circuit including a power storage device having a second capacity smaller than the first capacity and configured to supply electricity of a second voltage higher than the first voltage to the electric motor; and
   a power supply-switching unit that is configured to supply electricity from the second power supply circuit to the electric motor when an operation of the electric motor starts and thereafter supplies electricity from the first power supply circuit to the electric motor.

2. The power supply device for the supercharging system according to claim 1,
   wherein the power storage device of the first power supply circuit is a battery, and
   wherein the power storage device of the second power supply circuit is a capacitor.

3. The power supply device for the supercharging system according to claim 1, further comprising a power generator that is configured to generate electricity using the engine or kinetic energy of the exhaust gas,
   wherein the second power supply circuit boosts the electricity generated by the power generator to the second voltage and outputs the boosted electricity.

4. The power supply device for the supercharging system according to claim 1,
   wherein the power supply-switching unit is an analog circuit that is connected to the first power supply circuit and the second power supply circuit and supplies the higher one of a voltage of the first power supply circuit and a voltage of the second power supply circuit to the electric motor.

5. The power supply device for the supercharging system according to claim 1,
wherein the power supply-switching unit supplies electricity from the second power supply circuit to the electric motor when an operation of the electric motor starts and supplies electricity from the first power supply circuit to the electric motor when a first time elapses after the operation of the electric motor starts.

6. The power supply device for the supercharging system according to claim 5,
wherein the power supply-switching unit supplies electricity from the second power supply circuit to the electric motor when a second time longer than the first time elapses after the operation of the electric motor starts and supplies electricity from the first power supply circuit to the electric motor when a third time longer than the second time elapses after the operation of the electric motor starts.

7. A supercharging system, comprising:
a first compressor disposed in an intake air flow passage in which intake air supplied to an engine is circulated and configured to compress the intake air by being driven;
an electric motor that is configured to drive the first compressor;
a second compressor disposed in the intake air flow passage independently from the first compressor and configured to compress the intake air;
a turbine disposed in an exhaust gas flow passage in which exhaust gas from the engine is circulated and configured to drive the second compressor by being rotated in accordance with the exhaust gas; and
the power supply device according to claim 1.

8. An engine system, comprising:
an engine; and
the supercharging system according to claim 7.

9. A power supply control method for a supercharging system that includes:
a first compressor disposed in an intake air flow passage in which intake air supplied to an engine is circulated and configured to compress the intake air by being driven;
an electric motor that is configured to drive the first compressor;
a second compressor disposed in the intake air flow passage independently from the first compressor and configured to compress the intake air;
a turbine disposed in an exhaust gas flow passage in which exhaust gas from the engine is circulated and configured to drive the second compressor by being rotated by the exhaust gas;
a first power supply circuit including a power storage device having a first capacity and configured to supply electricity of a first voltage to the electric motor; and
a second power supply circuit including a power storage device having a second capacity smaller than the first capacity and configured to supply electricity of a second voltage higher than the first voltage to the electric motor,
the power supply control method comprising:
supplying electricity from the second power supply circuit to the electric motor when an operation of the electric motor starts; and
supplying electricity from the first power supply circuit to the electric motor after the supplying of electricity from the second power supply circuit to the electric motor.

* * * * *